United States Patent Office 3,380,121
Patented Apr. 30, 1968

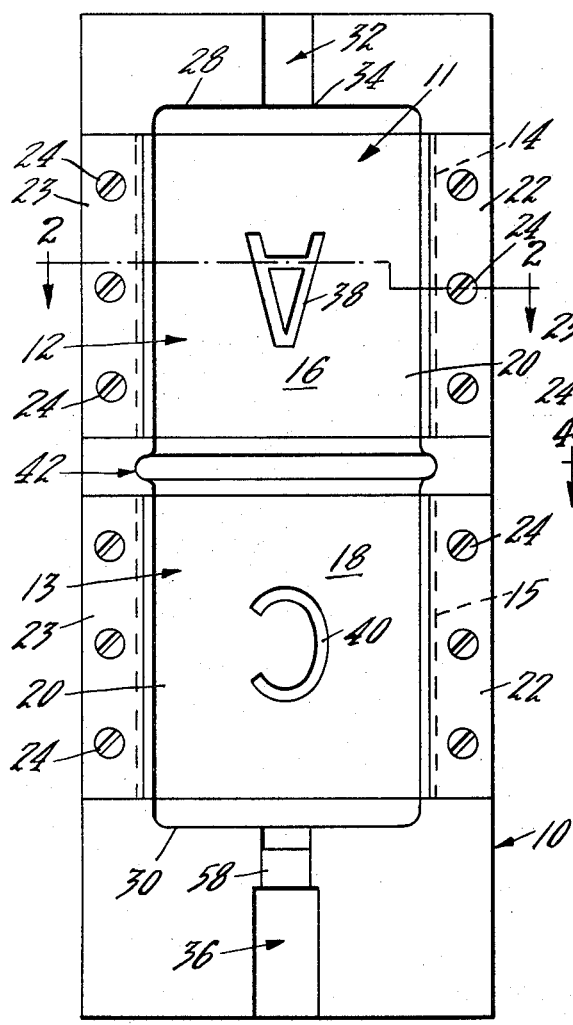
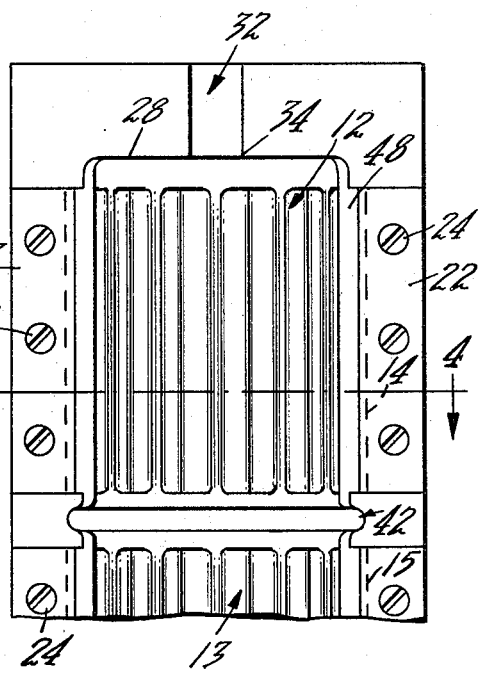
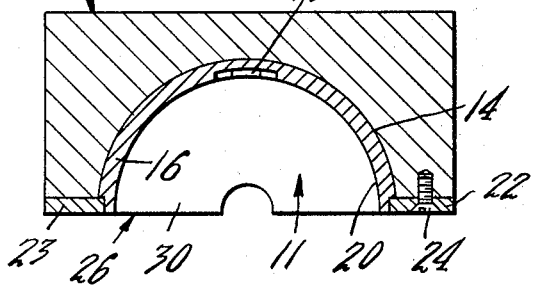
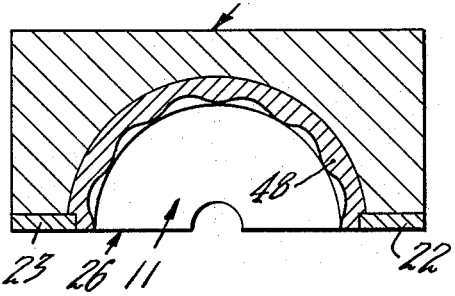

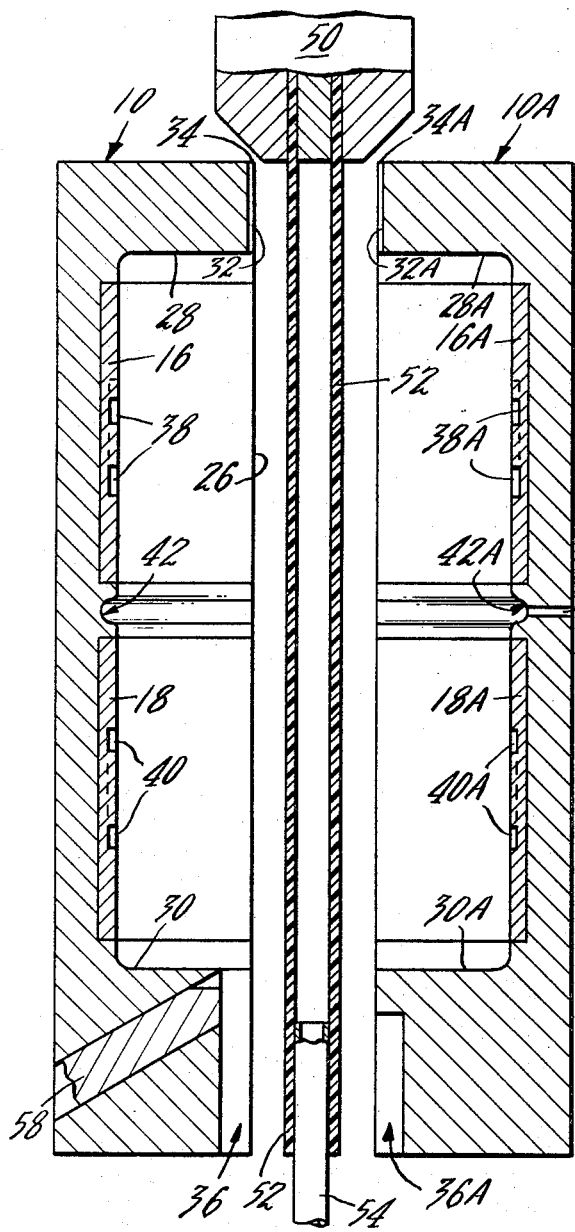
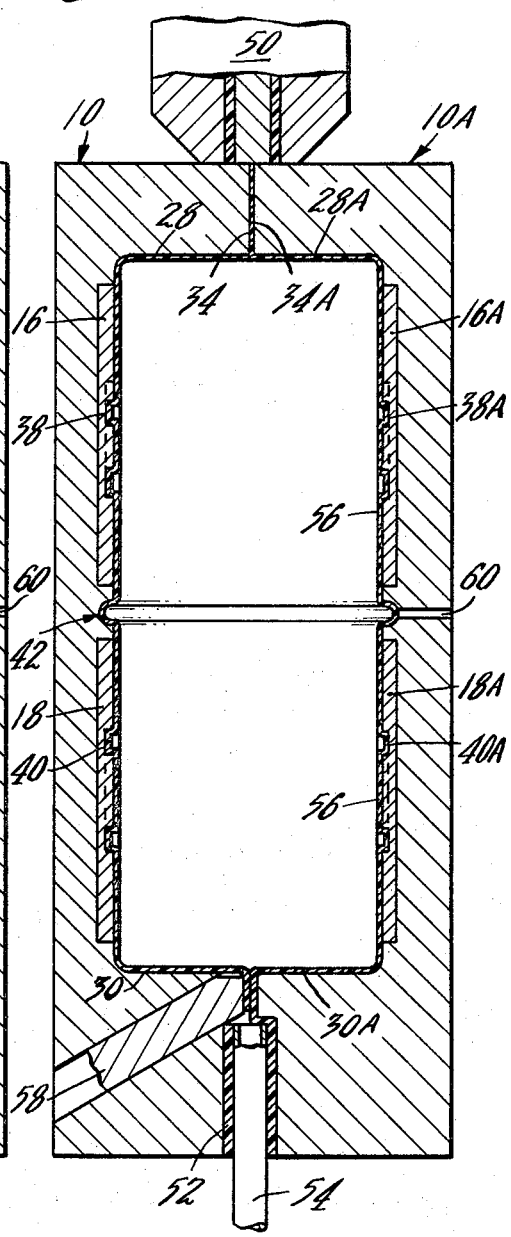

3,380,121
MOLD WITH REPLACEABLE INSERTS
Richard Marion Chittenden, Grayslake, and Oscar Frederick Ecklund, Barrington, Ill., assignors to American Can Company, New York, N.Y., a corporation of New Jersey
Filed July 30, 1965, Ser. No. 475,929
10 Claims. (Cl. 18—35)

ABSTRACT OF THE DISCLOSURE

A multisection mold for blow molding thermoplastic containers having recesses within the mold wall into which are inserted replaceable inserts so that the exterior appearance of a container blown within the mold may be changed without changing the basic shape and capacity of the container.

---

The present invention relates to a mold construction and has particular reference to a mold having replaceable inserts which can change the shape, size, and design of the article being molded by merely replacing inexpensive inserts that form part of the wall of the interior cavity of the mold.

A major cost factor in the molding of articles, particularly the blow molding of thermoplastic containers, is the expense of having a mold made for each different size and shape of article that is to be produced. It is not rare to find that many thousands of dollars must be expended to produce a new mold when only a minor change is desired in the configuration of the article to be blow molded. This necessarily limits the variety of designs and shapes that the blow molder may sell to a particular customer or a group of customers.

There have been some attempts to individualize and customize containers without utilizing a new and different mold for each container. It is thus standard practice in the mold making industry to use inserts in molds for embossing figures, letters, or designs on the article to be produced. These inserts are generally quite small and are used in cases where some minor portion of an embossed mold design is changed occasionally. In many cases these small inserts are made permanent parts of the mold and major remachining must be done in order to remove the insert and make the change in the mold design.

Large liners, such as shown in U.S. Patent 417,176 have also been used. However, these liners are really molds within mold holders and not inserts defining only part of the mold cavity.

It is therefore an object of the invention to provide a mold whose interior configuration and design may be changed without remachining the mold.

Another object is the provision of a mold whose cost is significantly lower than conventionally machined molds.

Still another object of the invention is the provision of a mold for use in the blow molding of thermoplastic containers whose interior surface may be readily and easily altered.

A further object is to provide a single mold body from which different blow molded articles may be produced.

Numerous other objects and advantages of the invention will be apparent as it is better understood from the following description, which, taken in connection with the accompanying drawings, discloses a preferred embodiment thereof.

The above objects are accomplished by providing a multi-section mold having an internal cavity therein when in a closed position. Recesses are formed in the inner surfaces of each section of the mold defining the cavity. Within the recesses are removable metal inserts defining the wall of the mold cavity and forming a surface against which an article being blown is expanded. Means are also provided for securing the inserts within the mold recesses so that the inserts can be easily and readily replaced within and removed from the recesses.

Referring to the drawings:

FIGURE 1 is a front elevational view of a mold section having hemi-spherical inserts therein;

FIG. 2 is a sectional view taken substantially along the line 2—2 in FIG. 1;

FIG. 3 is a fragmentary front elevational view of a mold having hemi-cylindrical inserts therein which produce a container of a different shape and size as that produced by the mold and inserts in FIG. 1;

FIG. 4 is a sectional view taken substantially along the line 4—4 in FIG. 3;

FIG. 5 is a sectional view of the mold having inserts therein, prior to closing about a preformed parison; and FIG. 6 is a sectional view showing a closed mold with a blown container therein.

As a preferred or exemplary embodiment of the instant invention, FIGURES 1 and 2 illustrate a mold sectional body 10 which is one-half of a two sectional mold utilized in the blow molding of molten thermoplastics. Provided within the mold 10 is a cavity 11.

As shown, the sectional mold 10 is divided internally in order that two distinct configurations may be produced during each blowing cycle. Both articles are of substantially the same shape, although it is possible by means of this invention to provide articles of different shapes.

Within the inner surfaces of both the upper and lower sections 12, 13 of the mold body 10 are recesses 14, 15 into which are positioned inserts 16 and 18. These inserts 16, 18 define most of the wall 20 of the mold cavity 11. As shown in the instant embodiment, two pairs of inserts are utilized within the mold cavity 11. However, it is readily apparent that a single pair of inserts could be used if a single article were to be blown within the mold.

The inserts 16, 18 are held in place within the recesses 14, 15 by means of clamps 22, 23 held in place by suitable means such as screws 24. It should be noted that the insert thus extends flush with the surface of the mold body 10 which forms a parting line 26 of the entire mold.

The upper and lower ends 28, 30 of the mold cavity 11 have the shape of the article to be blown and thus the article expands against these surfaces during blowing. The top edge of the mold section 10 is provided with a pinch pocket 32 and a pinch-off projection 34. The bottom edge of the mold has a passage 36 through which a blowing nozzle is positioned during expansion of a parison which has been placed within the mold. The interior configuration of the inserts 16, 18 thus control the size and shape of the tubular wall of any article that may be blown within the mold.

As shown in FIGURE 1, an indicia 38 is formed in the insert 16 whereas a separate and different indicia 40 is formed in the concave surface of the lower insert 18. In the form shown, the mold 10 is designed to provide two wide mouth containers interconnected at their mouths. As such, an annular groove 42 is located medially of the mold, and this groove separates the cavity 11 into the upper section 12 and the lower section 13. It is readily apparent that the upper section 12 and the lower section 13 could have distinctly different indicia and configurations if so desired, since the insert itself is the major controlling factor in the shape of the mold cavity 11.

It is therefore seen in FIGURES 3 and 4 that an insert 48 in the upper section 12 of the mold body 10 forms a container of a shape entirely different from that shown in FIGURE 1. Thus, it is possible to form and change the shape of any portion of a blown article within a plastic blow mold by merely changing an inexpensive insert which has the desired shape formed therein.

In the present embodiment a two sectional mold is utilized in the blowing operation. Thus, the inserts for each of the mold sectional bodies 10 are hemi-cylindrical in shape. It is readily apparent that if more sections were utilized or if inserts were placed in only portions of the mold, the shapes of the inserts could be somewhat different. However, in the present invention it is desired to control the shape and indicia of a tubular container body and thus the hemi-cylindrical shape is preferred.

Although the inserts themselves may be made of many different materials, it is preferred that the insert be of a metal having good thermal conductivity with respect to iron, since the mold sectional body 10 is usually produced from steel. Thus, those metals having a thermal conductivity equal to or greater than iron are most advantageous in making the inserts. It has been found that metals that may be used include magnesium, aluminum, copper, nickel, zinc, molybdenum, zirconium, tungsten and beryllium and alloys thereof. Of course, economic factors will generally indicate which metal is to be utilized. Results indicate that both magnesium and aluminum are adequate from both a technical and economic standpoint.

When magnesium or aluminum were used, any indicia formed in the concave surface of the insert may be done by means such as engraving, milling, or chemical etching. If desired, the inserts may be produced by powder metallurgy techniques which incorporate the indicia in the pressing operation.

FIGURES 5 and 6 illustrate the cooperation of the mold sections 10, 10A, having inserts 16, 16A and 18, 18A therein, during blowing. An extrusion nozzle 50 extrudes a parison 52 downwardly to surround the blow pin 54. Mold halves 10, 10A are then closed to the position shown in FIGURE 6. The projections 34, 34A pinch the upper end of the severed parison to a closed position. The extruded parison 52 is separated from the plastic within the extruder in a suitable manner (not shown) depending upon the particular extrusion method and apparatus used, so that the parison being extruded at any given time will have an open lower end capable of being telescoped over the blow pin 54. As shown in FIGURE 5, when the parison 52 is extruded, its diameter is of sufficient size to allow it to telescope freely over the blow pin 54.

When the mold halves 10 and 10A close, the walls forming the passage 36 squeeze the parison 52 tightly against the outside of the blow pin 54 to seal off the interior of the parison 52 from the atmosphere. Thus, the lower end of the parison 52 remains open above the blow pin 54 to permit the blowing fluid to be introduced thereinto.

As air or other suitable blowing fluid is supplied through the blow pin 54, the parison 52 is deformed outwardly into contact with the interior walls of the mold. Because of the heated and softened condition of the plastic, the parison assumes the configuration of the interior surface of the mold defining the mold cavity 11. Thus, the expanded parison 56 has a wall conforming to the shape of the mold inserts positioned within the recesses of each of the mold sections.

After the parison has been blown by the introduction of fluid for a short interval, the opening above the blow pin 54 is pinched or closed off by means of a sealing piston 58 which pinches off the bottom of the parison between the blow pin 54 and the now expanded parison 56. Before opening the mold halves 10 and 10A to eject the blown article therefrom, the air pressure is released from within the article. This can be accomplished in numerous ways, with one suitable way being to provide a small opening 60 communicating with the annular groove 42. A needle or other sharp instrument, not shown, can be inserted to the opening 60 to pierce the plastic, after such plastic has cooled, and the needle can then be withdrawn to allow the air to escape through the opening 60.

It is thought that the invention and many of its attendant advantages will be understood from the foregoing description and it will be apparent that various changes will be made in the form, construction, and arrangement of the parts without departing from the spirit and scope of the invention or sacrificing all of its material advantages, the form hereinbefore described being merely a preferred embodiment thereof.

We claim:

1. A mold for use in the blow molding of thermoplastic containers such that the basic container shape and capacity are not changed although the exterior appearance may be modified, comprising:
   a multisection mold body providing a cavity when in the closed position;
   the inner surfaces of each section of said mold having recesses formed therein, said recesses adapted to receive removable inserts;
   removable metal inserts within said recesses defining a major portion of the wall of the mold cavity and forming a surface against which an article being blown is expanded;
   and means for securing said inserts within said mold recesses so that said inserts may be easily and readily placed within and removed from said mold.

2. The mold of claim 1 wherein said multisection mold body is a two sectional mold.

3. The mold of claim 1 wherein said inserts form most of the tubular surface of said mold cavity.

4. The mold of claim 2 wherein said inserts are hemi-cylindrical in shape.

5. The mold of claim 1 wherein said metal inserts are made of a metal having good thermal conductivity with respect to iron.

6. The mold of claim 5 wherein said metal is magnesium.

7. The mold of claim 5, wherein said metal is aluminum.

8. The mold of claim 5 wherein the greatest constituent of said metal is copper.

9. The mold of claim 5 wherein said metal is zinc.

10. The mold of claim 5 wherein the surface of said inserts having a decorative finish produced by chemical etching.

References Cited

UNITED STATES PATENTS

| | | | |
|---|---|---|---|
| 1,822,451 | 9/1931 | Oestnaes | 249—112 |
| 2,601,700 | 7/1952 | Pinsky et al. | 249—104 X |
| 3,020,595 | 2/1962 | Szajna | 18—5 X |
| 3,057,011 | 10/1962 | Knox | 18—44 X |
| 3,061,880 | 11/1962 | Weisbach | 249—104 |
| 3,107,396 | 10/1963 | Fowler et al. | 18—44 X |
| 3,197,532 | 7/1965 | Maass | 18—5 X |

FOREIGN PATENTS 944,616   12/1963   Great Britain.

WILBUR L. McBAY, *Primary Examiner.*